(12) United States Patent
Glover

(10) Patent No.: US 10,743,639 B2
(45) Date of Patent: Aug. 18, 2020

(54) HAIR DISPENSER

(71) Applicant: Charlene W. Glover, Albany, GA (US)

(72) Inventor: Charlene W. Glover, Albany, GA (US)

(*) Notice: Subject to any disclaimer, the term of this patent is extended or adjusted under 35 U.S.C. 154(b) by 0 days.

(21) Appl. No.: 15/245,779

(22) Filed: Aug. 24, 2016

(65) Prior Publication Data
US 2018/0055196 A1 Mar. 1, 2018

(51) Int. Cl.
A45D 44/02 (2006.01)
A41G 5/00 (2006.01)
F16B 47/00 (2006.01)

(52) U.S. Cl.
CPC .............. A45D 44/02 (2013.01); A41G 5/004 (2013.01); F16B 47/00 (2013.01)

(58) Field of Classification Search
CPC .......... G07F 11/10; G07F 11/16; G07F 11/26; G07F 11/42; G07F 11/62; G07F 11/165
See application file for complete search history.

(56) References Cited

U.S. PATENT DOCUMENTS

| 5,875,794 A * | 3/1999 | Ekman ................. A45C 5/005 132/287 |
| 8,870,307 B1 * | 10/2014 | Provenzano .......... A45D 44/02 312/209 |
| 9,161,621 B1 * | 10/2015 | Huffin .................... A47B 81/00 |
| 2009/0008347 A1 * | 1/2009 | Bell ........................ A45D 44/02 211/61 |
| 2009/0098525 A1 * | 4/2009 | Cregg ...................... G09B 1/00 434/365 |
| 2009/0223991 A1 * | 9/2009 | Lorenzati ............. A47K 10/421 221/34 |
| 2015/0375920 A1 * | 12/2015 | Hammond ......... B65D 83/0805 221/1 |
| 2016/0073836 A1 * | 3/2016 | Giammanco ........ A47K 10/185 221/124 |
| 2016/0095373 A1 * | 4/2016 | Bell ........................ D05B 87/02 132/286 |

* cited by examiner

Primary Examiner — Gene O Crawford
Assistant Examiner — Kelvin L Randall, Jr.

(57) ABSTRACT

A hair dispensing device is described for managing the dispensation of hair for use in creating a weave hairstyle. The device can include a storage compartment and a wall having a slot through which hair is fed for use in creating the weave hairstyle. The slot can be formed in a dispensing panel that is installed on a wall of the device. The dispensing panel can be installed so as to be rotatable to facilitate the feeding of hair therethrough. A bottom of the device can include feet that reduce or eliminate sliding of the device when it is placed onto a surface during use. The bottom can also include one or more suction cups to anchor the device to the surface by suction. The hair can be stored in the storage compartment inside the device until used. The hair can be synthetic hair or real human hair.

2 Claims, 5 Drawing Sheets

HAIR DISPENSER

FIELD OF THE INVENTION

The invention relates to a hair dispensing device. More particularly, the invention relates to devices and methods for storing hair sanitarily and then managing the feed of the hair for use in creating a weave hairstyle.

BACKGROUND

Hair stylists who create common weave hairstyles traditionally have laid the real human hair or synthetic hair being used to create the weave hairstyle on the customer's shoulder or on other surfaces. Particularly in the case of weave hairstyles involving longer lengths of hair, managing the hair during application is cumbersome both in resting it on a surface as it being attached as well as in maintaining its cleanliness during application. Resting the hair on surfaces during application of the hair in creating the weave hairstyle can leave the hair vulnerable to contamination or soiling by spillage of chemicals used in hair salons or by other contaminants. In addition, the risk that the hair is dropped onto the floor is increased.

A need exists for a device to store hair to be used in creating a weave hairstyle to maintain its cleanliness until the hair is used.

An additional need exists for a device that assists in efficiently managing the feed of hair that is to be used in creating a weave hairstyle.

Another need exists for a hair dispensing device that is portable and capable of storing hair for later use.

SUMMARY

The devices and methods described herein relate to a hair dispensing device for managing the dispensation of hair for use in creating a weave hairstyle. The hair can be synthetic hair or real human hair. The device can include a storage compartment and a wall having a slot through which hair is fed for use in creating the weave hairstyle. The slot can be formed in a dispensing panel that is installed on a wall of the device. The dispensing panel can be installed so as to be rotatable to facilitate the feeding of hair therethrough. A bottom of the device can include feet that reduce or eliminate sliding of the device when it is placed onto a surface during use. Alternatively, or in addition to the feet, the bottom can also include one or more suction cups to anchor the device to the surface by suction. The hair can be stored in the storage compartment inside the device until used to maintain the sanitary condition of the hair.

The hair dispensing device and its related methods provide an advantage in that they maintain the hair to be used in creating a weave hairstyle in a sanitary condition until used by storing it inside the device. The device and related methods are advantageous in that they allow the hair to be stored in an interior storage compartment of the hair dispensing device so that the hair need not be rested upon a shoulder of the customer receiving application of the hairstyle or onto another surface where the hair could become contaminated or soiled. The device and related methods also provide an advantage by assisting hair stylist or other person in efficiently managing the feed of hair that is to be used in creating a weave hairstyle. The hair dispensing device and related methods provide yet another advantage in that the device is portable and capable of storing hair for later use.

Accordingly, the invention features a hair dispenser for dispensing synthetic hair. The hair dispenser includes a frame, a dispensing panel installed on the frame, and a storage compartment. The dispensing panel further includes a dispensing slot for receiving hair, and the dispensing slot passes through the dispensing panel.

In another aspect, the invention can feature the frame including a front wall, a left side wall attached to a left side of the front wall, and a right side wall attached to a right side of the front wall, to define a recessed area at a front of the hair dispenser.

In another aspect, the invention can feature an access located below the recessed area, wherein the access includes at least a first drawer that is openable to access the storage compartment.

In another aspect, the invention can feature the access including at least a second drawer that is openable to access a second storage compartment.

In another aspect, the invention can feature the hair dispenser further including a rear wall, a bottom, and a top.

In another aspect, the invention can feature the bottom including one or more feet attached.

In another aspect, the invention can feature the one or more feet being constructed from rubber, plastic, felt, metal, wood, ceramic, fabric, a composite material, any other suitable material, or a combination of one or more of the foregoing materials for elevating the bottom of the hair dispenser above a surface on which it rests.

In another aspect, the invention can feature the material from which the one or more feet are constructed including a material capable of preventing sliding movement of the hair dispenser across the surface during use.

In another aspect, the invention can feature the one or more feet including or being suction cups for removably anchoring the hair dispenser by suction to a surface on which it rests to prevent sliding movement of the hair dispenser across the surface during use.

In another aspect, the invention can feature the one or more feet including or being adhesive pads for attaching the hair dispenser to a surface on which it rests to prevent sliding movement of the hair dispenser across the surface during use.

In another aspect, the invention can feature the dispensing panel being installed on the frame by connection of a left side of the dispensing panel to a left side wall of the frame and by connection of a right side of the dispensing panel to a right side wall of the frame.

In another aspect, the invention can feature the dispensing panel being rotatable.

In another aspect, the invention can feature the top including a handle.

The invention can also feature a portable hair dispensing device that includes one or more walls surrounding an interior space for storing hair and at least one of the one or more walls defining a recessed area in which a dispensing panel is installed on at least one of the one or more walls. The dispensing panel includes a slot through which hair is dispensable from the interior space.

In another aspect, the invention can feature a bottom that includes one or more suction pads for removably anchoring the hair dispensing device by suction to a surface on which it rests to prevent sliding movement of the hair dispensing device across the surface during use.

A method of the invention can be used to dispense hair for use in creating a weave hairstyle. The method can include the steps of: (a) placing hair into a storage compartment of a hair dispensing device; (b) feeding a first end of the hair inside the storage compartment through a slot formed through a dispensing panel of the hair dispensing device so that the first end of the hair is pulled through the slot so as to be outside of the hair dispensing device, wherein the dispensing panel is installed on a frame of the hair dispensing device; and (c) pulling one or more lengths of hair through the slot, as needed, for use in creating the weave hairstyle.

Another method of the invention can include the step of (d) removably anchoring the hair dispensing device to a surface by suction during use using one or more suction pads to prevent sliding movement of the hair dispensing device across the surface.

Another method of the invention can feature the hair being synthetic hair.

Another method of the invention can feature the slot being rotatable and is installed on the at least one wall of the hair dispensing device, wherein the method can further include the step of: (e) rotating the dispensing panel to manage the dispensation of hair from the hair dispensing device.

Another method of the invention can include step (a) of the method further including the step of: (f) keeping the hair sanitary by storing the hair within the storage compartment until it is used.

Unless otherwise defined, all technical terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents and other references mentioned herein are incorporated by reference in their entirety. In the case of conflict, the present specification, including definitions will control.

DETAILED DESCRIPTION

Figure 1:
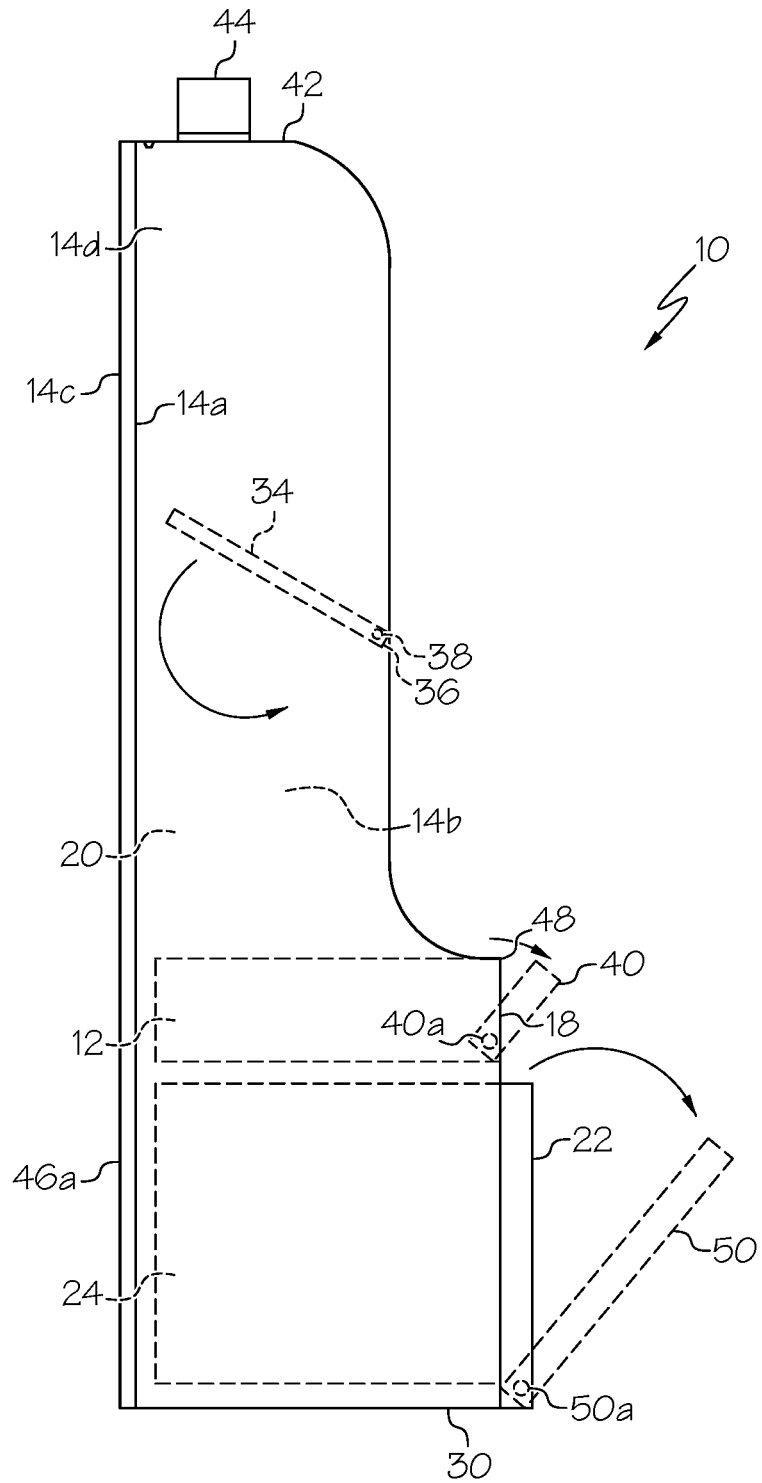
FIG. 1 is a left side elevation view of a hair dispensing device.

The present invention is best understood by reference to the detailed drawings and description set forth herein. Embodiments of the invention are discussed below with reference to the drawings; however, those skilled in the art will readily appreciate that the detailed description given herein with respect to these figures is for explanatory purposes as the invention extends beyond these limited embodiments. For example, in light of the teachings of the present invention, those skilled in the art will recognize a multiplicity of alternate and suitable approaches, depending upon the needs of the particular application, to implement the functionality of any given detail described herein beyond the particular implementation choices in the following embodiments described and shown. That is, numerous modifications and variations of the invention may exist that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The present invention should not be limited to the particular methodology, compounds, materials, manufacturing techniques, uses, and applications, described herein, as these may vary. The terminology used herein is used for the purpose of describing particular embodiments only, and is not intended to limit the scope of the present invention. As used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" may be a reference to one or more steps or means and may include sub-steps and subservient means.

All conjunctions used herein are to be understood in the most inclusive sense possible. Thus, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. Structures described herein are to be understood also to refer to functional equivalents of such structures. Language that may be construed to express approximation should be so understood unless the context clearly dictates otherwise.

Unless otherwise defined, all terms (including technical and scientific terms) are to be given their ordinary and customary meaning to a person of ordinary skill in the art, and are not to be limited to a special or customized meaning unless expressly so defined herein.

Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "having" should be interpreted as "having at least"; the term "includes" should be interpreted as "includes but is not limited to"; the term "example" is used to provide exemplary instances of the item in discussion, not an exhaustive or limiting list thereof; and use of terms like "preferably," "preferred," "desired," "desirable," or "exemplary" and words of similar meaning should not be understood as implying that certain features are critical, essential, or even important to the structure or function of the invention, but instead as merely intended to highlight alternative or additional features that may or may not be utilized in a particular embodiment of the invention.

Those skilled in the art will also understand that if a specific number of an introduced claim recitation is intended, such an intent will be explicitly recited in the claim, and in the absence of such recitation no such intent is present. For example, as an aid to understanding, the appended claims may contain usage of the introductory phrases "at least one" and "one or more" to introduce claim recitations; however, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C" is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

All numbers expressing dimensions, quantities of ingredients, reaction conditions, and so forth used in the specification are to be understood as being modified in all instances by the term "about" unless expressly stated otherwise. Accordingly, unless indicated to the contrary, the numerical parameters set forth herein are approximations that may vary depending upon the desired properties sought to be obtained.

Figure 2:
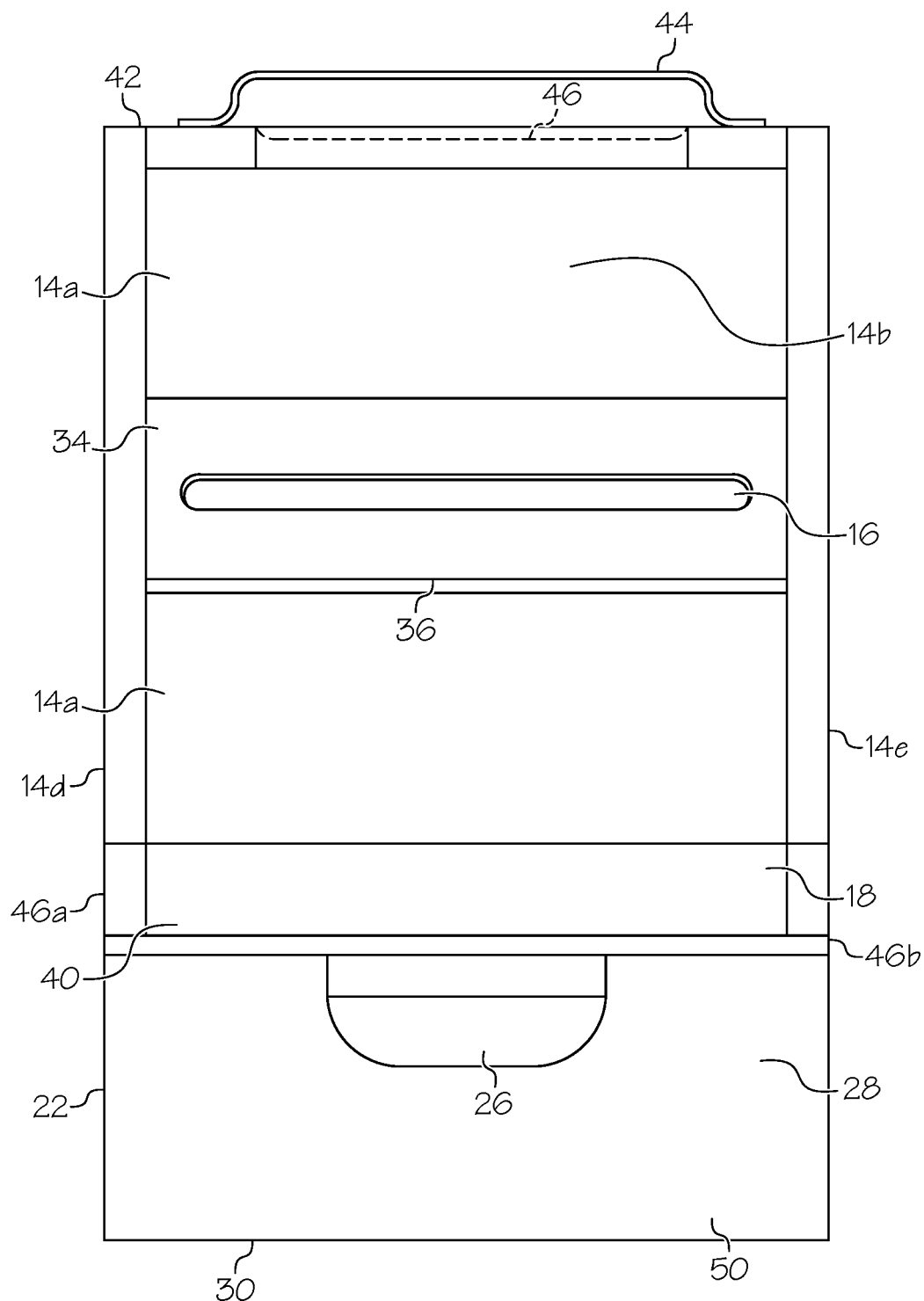
FIG. 2 is a front elevation view of the hair dispensing device of FIG. 1.
Figure 3:
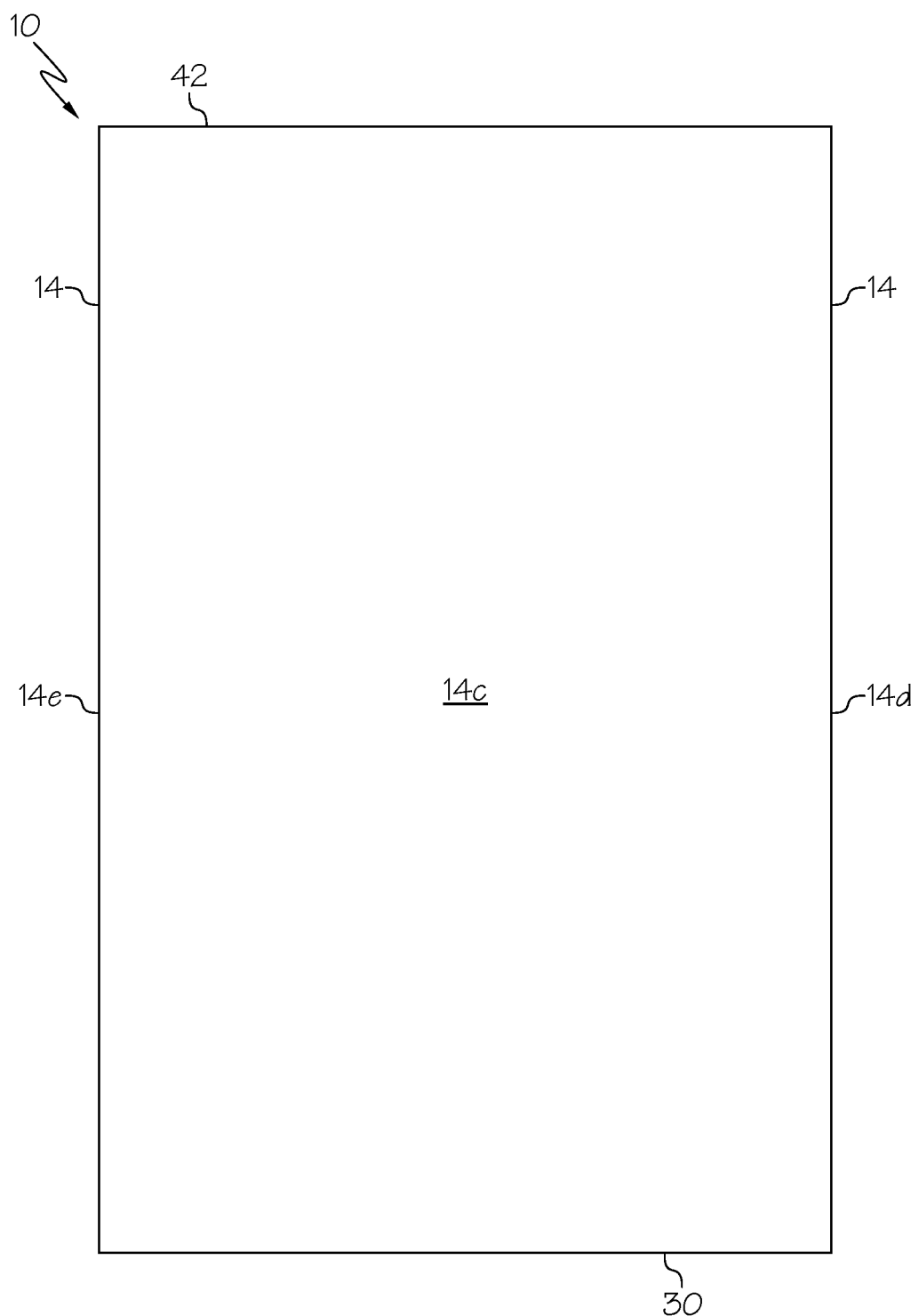
FIG. 3 is a rear elevation view of the hair dispensing device of FIG. 1.
Figure 4:
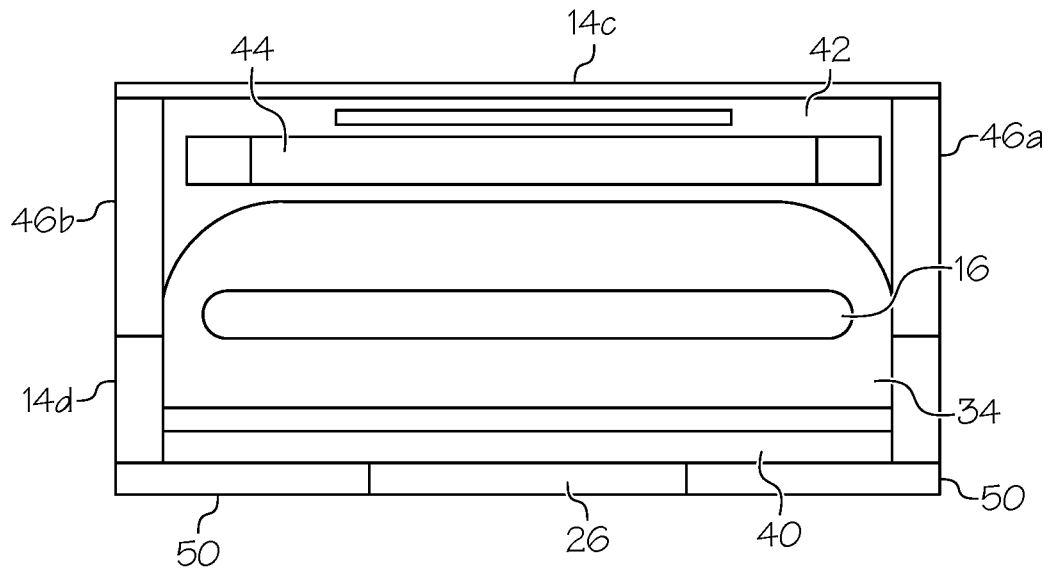
FIG. 4 is a top plan view of the hair dispensing device of FIG. 1.
Figure 5:
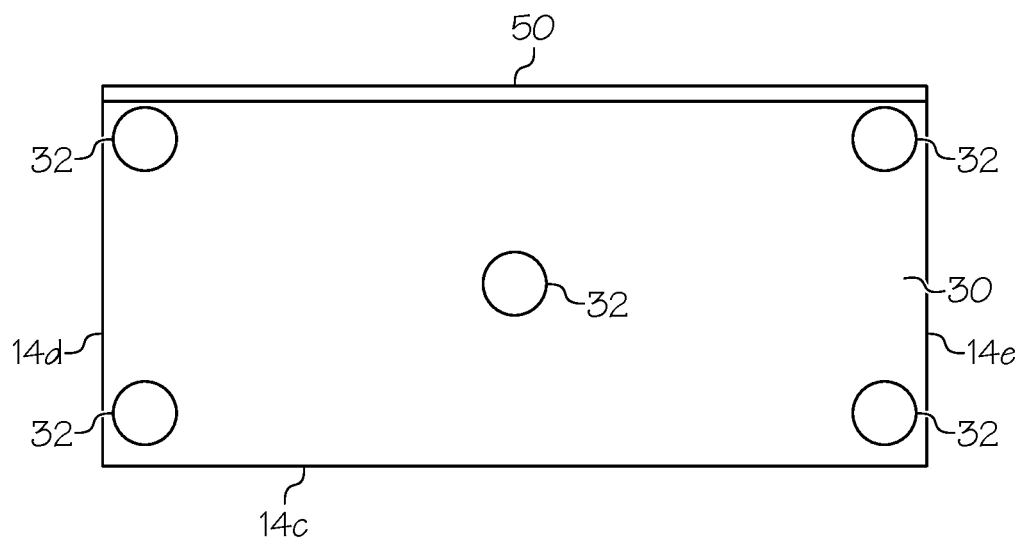
FIG. 5 is a bottom plan view of the hair dispensing device of FIG. 1.
Figure 6:
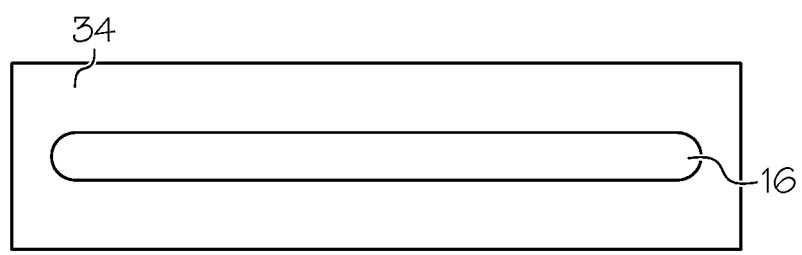
FIG. 6 is a front elevation view of a dispensing panel of the hair dispensing device of FIG. 1.

The invention provides a hair dispenser 10 (also referred to herein as a hair dispensing device) for dispensing hair. The hair that is stored in and dispensed from the hair dispenser can be synthetic hair or real human hair and can be used to create a weave hairstyle in which the hair dispensed from the device is weaved into or otherwise attached to an individual's actual growing hair. The hair dispenser 10 includes a storage compartment 12 and a frame constructed from one or more walls 14. The one or more walls 14 of the hair dispenser 10 can include a front wall 14a. In an exemplary embodiment, the front wall 14a can be recessed, as shown in FIGS. 1 and 2, so that the front wall is not flush with the front edges of the side walls or with any drawers of the hair dispenser 10. A recessed area 14b is formed between the front wall 14a and a left side wall 14d and a right side wall 14e so that the front wall 14a is positioned at or near a rear portion of the recessed area 14b. The recessed area 14b is open at the front of the hair dispenser 10, being enclosed on its three vertical sides by only the front wall 14a, left side wall 14d, and right side wall 14e.

A dispensing panel 34 having a dispensing slot 16 (also referred to simply as a slot herein) can be installed on the frame. The dispensing panel can be installed in the recessed area 14b in front of the front wall 14a and between the left and right side walls 14d, 14e. The dispensing panel 34 can be rotatable at a hinge 38 or hinges that connect a left side of the dispensing panel to the left side wall 14d and a right side of the dispensing panel to the right side wall 14e of the hair dispenser. In one embodiment, the hinge 38 can be a single unit that rotatably connects the left and right sides of the dispensing panel 34 to the left and right side walls 14d, 14e. In another embodiment, the hair dispenser 10 can be include two hinges (or swivels) where one is installed on the left side of the dispensing panel 34 to rotatably connect the dispensing panel to the left side wall 14d and the other is installed on the right side of the dispensing panel to rotatably connect the dispensing panel to the right side wall 14e. Hair is pulled through the dispensing slot 16 of the dispensing panel 34 by a user using the hair to create a weave hairstyle.

In different embodiments, the hinge or hinges can be installed near a front edge of the dispensing panel 34, close to or at a center of the left and right sides of the dispensing panel, or near a rear edge of the dispensing panel. The hinge (or hinges) allows the angle of the dispensing panel and its dispensing slot to be adjusted by a user for easier retrieval of hair through the slot while in use, which may be convenient and necessary depending on the height of the user as well as whether the user is standing or sitting and the elevation of the hair dispenser 10 relative to the position of the user.

In one embodiment, the front wall 14a can be the reverse side of a rear wall 14c, i.e., the front wall and rear wall can be opposite sides (a front side and a rear side) of a single wall. In other embodiments, the front wall 14a and rear wall 14c can be two separate opposing walls.

Beneath the recessed area 14b, the hair dispenser can also include an access 18 to the storage compartment 12. The access 18 can include at least a first drawer 18 that is openable to access the storage compartment 12. Hair can be stored in the at least first drawer 18 so as to be capable of feeding from that drawer upward through a lower interior space 20 of the hair dispenser 10 and out of the slot 16. The lower interior space 20 can be a portion of the recessed area 14b that is below the dispensing panel 34 but above the storage compartment 12. The at least first drawer 18 within which the storage compartment 12 is formed is sanitary and can be constructed from a material that is anti-bacterial, anti-fungal, or both. In exemplary embodiments, the at least first drawer 18 can be located on the front wall of the hair dispenser 10. In other embodiments, the at least first drawer may be located on a wall of the hair dispenser other than the front wall.

In an exemplary embodiment, the storage compartment 12 of the at least first drawer 18 can be open and accessible through the recessed area 14b. In other embodiments, the storage compartment 12 of the at least first drawer 18 can be covered by a bottom wall installed above the at least first drawer to separate and conceal it from the recessed area 14b. In such embodiments having a bottom wall, the bottom wall can include a bottom wall slot through which hair stored in the storage compartment 12 can be fed and pulled through the recessed area 14b and out of the dispensing slot 16.

The hair dispenser 10 can also include at least a second drawer 22 that is openable to access a second storage compartment 24. The second storage compartment 24 of the second drawer 22 can be used to store additional hair, hair styling tools (e.g., hair brushes, combs, etc.), or other supplies (e.g., hair care products, shampoos, conditioners, hair styling products, etc.). The second drawer 22 within which the second storage compartment 24 is formed is also sanitary and also can be constructed from a material that is anti-bacterial, anti-fungal, or both. In exemplary embodiments, the at least second drawer 22 can be located on the front wall 14a of the hair dispenser 10. In other embodiments, the at least second drawer may be located on a wall of the hair dispenser other than the front wall.

In other embodiments, the hair dispenser 10 can include additional drawers or compartments for storing other hair styling tools or supplies. In some embodiments, these additional drawers or compartments may be located on and accessed through the front wall of the hair dispenser. In other embodiments, these drawers and compartments may be located on a wall of the hair dispenser other than the front wall.

The drawers of the hair dispenser can include handles, knobs, or other ergonomic features that permit the opening and closing of the drawers to access the compartments inside of them. In some embodiments (for example, the embodiments shown in the drawings), one or more drawers of the hair dispenser 10 can include a cut-out portion 26 of a drawer face 28 that is cut out so that a user may grasp the drawer and pull it open or to allow for grasping a handle installed across the cut-out portion and attached to opposing surfaces of the drawer face where the cut-out portion terminates. In an exemplary embodiment, as shown in FIG. 2, the cut-out portion may be located at a top of the drawer face and have a handle installed across it. In other embodiments, the cut-out portion can be located on a side or bottom of the drawer face. In one embodiment of the hair dispenser, when installed, the at least first drawer can be located in a position that is lower than the dispensing panel but above the bottom. In other embodiments, when installed, the at least second drawer can be located in a position that is immediately above the bottom of the hair dispenser but beneath the at least first drawer.

In one embodiment, the hair dispenser 10 can include a single side wall so that the hair dispenser is generally cylindrical in shape. In other embodiments, the hair dispenser can include the front wall, a rear wall, a left side wall, a right side wall. In still other embodiments, the hair dispenser can include three, five, six, seven, eight, or more side walls. The hair dispenser includes a bottom and a top that, with the at least one side wall, enclose an interior space. In exemplary embodiments, the interior space is the recessed area 14b and is not fully enclosed but is accessible to a user via one side of the hair dispenser that lacks a wall. For example, in some alternate embodiments, the hair dispenser can include one, two, or three walls that do not enclose an entirely enclosed interior space so that the storage compartment and an interior surface of the dispensing panel are accessible from one side of the hair dispenser without removing any walls or panels. In other embodiments described herein, the interior space can be completely enclosed by walls on all sides so that the interior space is accessible through the slot or through the at least first drawer.

The hair dispenser 10 can feature its bottom 30 including one or more feet 32 attached thereto to support the bottom of the hair dispenser above a surface on which the hair dispenser is rested. The one or more feet can be constructed from rubber, plastic, felt, metal, wood, ceramic, fabric, a composite material, any other suitable material, or a combination of one or more of the foregoing materials for elevating the bottom of the hair dispenser above a surface on which it rests. In exemplary embodiments of the hair dispenser, the material from which the one or more feet are constructed can be a material capable of preventing sliding movement of the hair dispenser across the surface during use. Rubber feet are particularly useful for this purpose.

In addition to the one or more feet (or in some embodiments, in lieu of the one or more feet), the hair dispenser 10 can feature one or more suction cups for removably anchoring the hair dispenser by suction to a surface on which it rests to prevent sliding movement of the hair dispenser across the surface during use. In some embodiments that include both feet and suction cups, the one or more suction cups may each be attached to a bottom of one of the one or more feet. The suction cups assist in maintaining the hair dispenser in a stationary position as hair is being pulled through the slot during use of the device. When the suction between the suction cups and the surface on which they are rested is broken, the hair dispenser is once more made to be easily portable.

In another embodiment, the hair dispenser 10 can feature the one or more feet 32 including or being adhesive pads for attaching the hair dispenser to a surface on which it rests to prevent sliding movement of the hair dispenser across the surface during use. The adhesive pads assist in maintaining the hair dispenser in a stationary position as hair is being pulled through the slot during use of the device.

In an alternate embodiment, rather than being positioned toward the rear portion of the recessed area 14b, the front wall 14a can be installed at a front or forward position on the hair dispenser 10 so that a front side of the front wall is entirely or substantially flush with or coplanar to front edges of the left and right side walls 14d, 14e. In this embodiment, the front wall 14a can include the dispensing panel 34 through which the dispensing slot 16 passes. The dispensing panel 34 can be a separate part that is installed on the front wall 14a in an aperture through the front wall that corresponds generally in shape and size to the shape and size of the dispensing panel. The dispensing panel 34 can be rotatable. The rotatable dispensing panel 34 can include a hinge 38 to connect the dispensing panel to the front wall 14a at a bottom edge of the aperture within which the dispensing panel is installed.

In various embodiments of the hair dispenser, the dispensing panel may be rotated inward, outward, or in both orientations. The rotational movement of the dispensing panel assists not only in inserting hair through the slot initially but also in maintaining a feed of hair through the slot during use of the hair dispenser to dispense hair to create the weave hairstyle.

A top 42 of the hair dispenser 10 can include a handle 44 to enhance the portability of the device. The handle 44 may be an integral part of the top 42 of the hair dispenser 10, or in other embodiments, the handle can be a separate and discrete part that is attached to the top of the hair dispenser to facilitate carrying and portability of the device.

The invention can also feature a portable hair dispensing device that includes one or more walls surrounding an interior space for storing hair and at least one of the one or more walls including a slot through which hair is dispensable from the interior space.

The wall or walls (including top and bottom), drawer or drawers, and dispensing panel of the hair dispenser can be constructed from plastic, metal, a composite material, any other suitable material, or one or more of the foregoing. The material from which these parts are constructed can be anti-microbial, anti-bacterial, and/or anti-fungal to enhance its sanitary qualities.

In some embodiments, the hair dispenser may include mechanical hair dispensing devices installed inside the hair dispenser to assist in managing the feed of hair therethrough and to dispense hair through the slot as needed by the hair stylist or other user.

Although the hair dispenser can be made with any desired dimensions or other specifications, as shown in FIGS. 1-6, the following provides one example of one embodiment of the hair dispenser 10 and is provided as an example only and is not intended to limit the numerous possible embodiments, shapes, and sizes of hair dispensers that are contemplated herein. In the example, the hair dispenser 10 can include a front wall 14a (in this case, a front side of a single wall), a rear wall 14c (in this case, the reverse rear side of the single wall that includes the front wall), a left side wall 14d, a right side wall 14e, a top 42, and a bottom 30. The front wall 14a, left side wall 14*d*, and right side wall 14*e* define a recessed area 14*b* at the front of the hair dispenser 10. The front wall 14*a* and rear wall 14*c* can each be about 13 inches wide and about 20 inches tall. The rear wall 14*c* can be about 0.25 inch thick. The left side wall 14*d* and the right side wall 14*e* can be about 20 inches tall, about 4 inches wide near the top, and about 6.5 inches near the bottom. The left side wall 14*d* and the right side wall 14*e* can each be about 0.75 inch thick. A wider bottom portion 46*a* and 46*b* of each of the left side wall 14*d* and right side wall 14*e* provide additional depth so that the at least first drawer 18 and storage compartment 12 include sufficient space to receive and store the hair. The top 42 and bottom 30 of the hair dispenser 10 can be about 6.5 inches wide and about 13 inches long. The handle 44 on the top 42 of the hair dispenser 10 can be about 6 inches long and about 0.25 inches wide. The top 42 may include an indentation 46 beneath or adjacent that is about 3/32 inch deep to permit easier grasping of the handle 44. The dispensing panel 34 can be about 11.5 inches long and about 3 inches wide while the slot 16 can be generally centered within and slightly less the length of the dispensing panel. The slot 16 can be about 1 inch wide. The dispensing panel 34 is rotatably installed in the recessed area 14*b* by connection of its left side to the left side wall 14*d* and of its right side to the right side wall 14*e*. The bottom edge 36 of the dispensing panel 34 can be about 12 inches above the bottom 30 of the hair dispenser 10. A bottom edge 36 of the dispensing panel 34 can be attached by a hinge 38 to the left and right side walls 14*d*, 14*e*. The dispensing panel 34 may be partially rotatable inward in this example. A top edge 48 of a first drawer of the hair dispenser is about 7 inches vertically above the bottom 30 of the hair dispenser. The first drawer 18 of the hair dispenser 10 is about 13 inches wide and about 6.5 inches deep. The first drawer 18 can include a door 40 that opens outwardly by pulling out and downward on a hinge 40*a* that connects left and right sides of the first drawer 18 to the left and right side walls 14*d*, 14*e*. A second drawer 22 is installed beneath the first drawer 18. The second drawer 22 can include a door 50 that opens outwardly by pulling out and downward on a hinge 50*a* that connects left and right sides of the second drawer 22 to the left and right side walls 14*d*, 14*e*. In this embodiment, the total height of the hair dispenser 10 will be slightly more than 20 inches due to the handle 44 installed on the top 42 and the feet 32, suction cups, or adhesive pads that would be installed on the bottom 30.

The invention also includes methods for dispensing hair for use in creating a weave hairstyle. The hair featured in these methods can be synthetic hair or real human hair. One such method can include the steps of placing hair into a storage compartment of a hair dispensing device, and then feeding a first end of the hair inside the storage compartment through a slot formed through a wall of the hair dispensing device so that the first end of the hair is pulled through the slot so as to be outside of the hair dispensing device. The method can also include the step of pulling one or more lengths of hair through the slot, as needed, for use in creating the weave hairstyle.

The method can also include the step of removably anchoring the hair dispensing device to a surface by suction during use using one or more suction pads to prevent sliding movement of the hair dispensing device across the surface.

The method can also feature the slot being formed through a rotatable dispensing panel that is installed in the wall of the hair dispensing device. In this embodiment, the method can further include the step of rotating the dispensing panel to manage the dispensation of hair from the hair dispensing device.

The method can also include the step of keeping the hair sanitary by storing the hair within the storage compartment until it is used.

The methods described herein utilize the various embodiments of the hair dispenser described herein. Additional steps of the method can be used with embodiments of the hair dispenser that include mechanical devices installed inside the hair dispenser to feed and dispense hair through the slot. For example, such methods may include steps related to turning on and turning off power to the hair dispenser and to operating electric or electronic controls controlling the speed at which hair is dispensed or the amount or length of hair that is dispensed.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A hair dispenser system for dispensing and managing the feed of hair to a user, the hair dispenser system consisting of:
   hair for use in creating a weave hairstyle;
   a frame consisting of a front wall, a left side wall, and a right side wall defining an open recessed area accessible from a front side of the hair dispenser, wherein the front wall is at or near a rear portion of the recessed area, a handle, and a second openable drawer;
   a dispensing panel installed on the frame in the recessed area between the left side wall and the right side wall, the dispensing panel further consisting of a dispensing slot for receiving the hair, wherein the dispensing slot passes through the dispensing panel;
   a hair storage compartment for storing the hair that feeds through the dispensing slot; and
   an access located below the recessed area, wherein the access includes at least a first drawer that is openable to access the storage compartment.

2. A portable hair dispensing system for dispensing and managing the feed of hair to a user, the system consisting of:
   hair for use in creating a weave hairstyle;
   one or more walls surrounding an interior space for storing the hair, wherein the one or more walls consist of a frame consisting of at least a front wall, a left side wall, and a right side wall, which define an open recessed area accessible from a front side of the device, wherein the front wall is at or near a rear portion of the recessed area, a handle, and a second openable drawer;
   a dispensing panel installed in the recessed area between the left side wall and the right side wall, wherein the dispensing panel is rotatable and consists of a slot through which the hair is dispensable from the interior space; and an access located below the interior space, wherein the access includes at least a first drawer that is openable to access a storage compartment.

* * * * *